(12) United States Patent
Liem et al.

(10) Patent No.: US 6,560,852 B2
(45) Date of Patent: May 13, 2003

(54) DISC DRIVE WITH ACTUATOR ARM CONFIGURED FOR REDUCED OUT-OF-PHASE MOTION

(75) Inventors: Andre Liem, Singapore (SG); Joseph Lau, Singapore (SG); CheeWai Seetoh, Singapore (SG); Jierapipatanakul Niroot, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 174 days.

(21) Appl. No.: 09/778,163

(22) Filed: Feb. 6, 2001

(65) Prior Publication Data

US 2001/0045004 A1 Nov. 29, 2001

Related U.S. Application Data

(60) Provisional application No. 60/180,749, filed on Feb. 7, 2000.

(51) Int. Cl.[7] .............................................. G11B 5/127
(52) U.S. Cl. ............................... 29/603.03; 29/603.08; 29/603.01
(58) Field of Search .................... 29/603.01, 603.03, 29/603.07, 603.08, 603.09, 603.12, 603.19; 360/106, 107, 104, 105, 109

(56) References Cited

U.S. PATENT DOCUMENTS

| | | |
|---|---|---|
| 5,014,146 A | 5/1991 | Takatsuka et al. |
| 5,126,904 A | 6/1992 | Sakurai |
| 5,306,994 A | 4/1994 | Supino |
| 5,392,179 A | 2/1995 | Sendoda |
| 5,459,921 A | 10/1995 | Hudson et al. |
| 5,790,348 A | 8/1998 | Alfred et al. |
| 5,812,342 A | 9/1998 | Khan et al. |
| 5,825,582 A | 10/1998 | Supino et al. |
| 5,905,608 A | 5/1999 | Frees et al. |
| 5,936,808 A | 8/1999 | Huang et al. |
| 5,956,209 A | 9/1999 | Shum |
| 5,973,883 A | 10/1999 | Yanagisawa |
| 5,978,752 A | 11/1999 | Morris |
| 5,991,122 A | 11/1999 | Tangren et al. |
| 5,999,369 A | 12/1999 | Shimizu et al. |
| 6,005,750 A | 12/1999 | Willard et al. |
| 6,018,871 A | 2/2000 | Khan et al. |
| 6,023,574 A | 2/2000 | Tangren |
| 6,046,884 A | 4/2000 | Crane |

*Primary Examiner*—David J. Walczak
(74) *Attorney, Agent, or Firm*—Derek J. Berger

(57) ABSTRACT

Disc drives are made with an actuator designed with at least one asymmetrical arm having two masses that move out of phase. The arm is modified by removing a portion of the higher-energy (longitudinal) side, the one with the greater total time-averaged strain energy. This modification reduces the phase difference between the first and the second arm, particularly for a relevant frequency range of interest. Disc drives made by this method exhibit a generally reduced out-of-phase motion, enhancing performance during seeking and track following, especially for arms with two heads that interact with surfaces of opposing discs.

11 Claims, 8 Drawing Sheets

DISC DRIVE WITH ACTUATOR ARM CONFIGURED FOR REDUCED OUT-OF-PHASE MOTION

RELATED APPLICATION

This application claims the benefit of U.S. Provisional Application Ser. No. 60/180,749, filed Feb. 7, 2000 under 35 U.S.C. 119(e).

FIELD OF THE INVENTION

The present invention relates to the field of mass storage devices. More particularly, this invention relates to actuator arms used in such devices.

BACKGROUND OF THE INVENTION

One key component of any computer system is a device to store data. Computer systems have many different places where data can be stored. One common place for storing massive amounts of data in a computer system is on a disc drive. The most basic parts of a disc drive are an information storage disc that is rotated, an actuator that moves a transducer to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

The transducer is typically placed on a small ceramic block, also referred to as a slider that is aerodynamically designed so that it flies over the disc. The slider is passed over the disc in a transducing relationship with the disc. Most sliders have an air-bearing surface (ABS) which includes rails and a cavity between the rails. When the disc rotates (generally, at rotational speeds of 10,000 RPM or higher), air is dragged between the rails and the disc surface causing pressure, which forces the head away from the disc. At the same time, the air rushing past the cavity or depression in the air-bearing surface produces a negative pressure area. The negative pressure or suction counteracts the pressure produced at the rails. The slider is also attached to a load spring, which produces a force on the slider directed toward the disc surface. The various forces on the slider equilibrate, so that the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the storage disc. Disc drive systems read and write information stored on tracks on storage discs. Transducers, in the form of read/write heads attached to the sliders, located on both sides of the storage disc, read and write information on the storage discs when the transducers are accurately positioned over one of the designated tracks on the surface of the storage disc. The transducer is also required to be moved to a target track. As the storage disc spins and the read/write head is accurately positioned above a target track, the read/write head can store data onto a track by writing information representative of data onto the storage disc. Similarly, reading data on a storage disc is accomplished by positioning the read/write head above a target track and reading the stored material on the storage disc. To write on or read from different tracks, the read/write head is moved radially across the tracks to a selected target track. The data is divided or grouped together on the tracks. In some disc drives, the tracks are a multiplicity of concentric circular tracks. In other disc drives, a continuous spiral is one track on one side of the disc drive. Each track on a disc surface in a disc drive is further divided into a number of short arcs called sectors. Servo feedback information is used to accurately locate the transducer head on to the tracks/sectors. The actuator assembly is moved to the required position and held very accurately during a read or write operation using the servo information.

The actuator assembly is composed of many parts that contribute to the performance required to accurately hold the read/write head in the proper position. There are two general types of actuator assemblies, a linear actuator and a rotary actuator. The rotary actuator includes a pivot assembly, an arm, a voice coil yoke assembly, and a head gimbal suspension assembly. The rotary actuator assembly pivots or rotates to reposition the transducer head over particular tracks on a disk. A suspension or load beam is part of the head gimbal suspension assembly. The rotary actuator assembly also includes a main body, which includes a shaft and bearing about which the rotary actuator assembly pivots. Attached to the main body are one or more arms. One or typically two head gimbal suspension assemblies are attached to the arm.

One end of the suspension is attached to the actuator arm assembly. The transducer head, also known as a read/write head, is found attached to the other end of the suspension. One end of the actuator arm assembly is coupled to a pivot assembly. The pivot assembly, in turn, is connected to a voice coil motor attached to a voice coil yoke on the main body of the actuator assembly. The other end of the actuator arm assembly is attached to the head gimbal suspension assembly. The head gimbal suspension assembly includes a gimbal to allow the read/write head to pitch and roll and follow the topography of the imperfect memory disc surface. The head gimbal assembly also restricts motion with respect to the radial and circumferential directions of the memory disc. The suspension assembly is coupled to the actuator arm assembly as part of the main body of the actuator assembly, which holds the pivot support and is coupled to the voice coil motor.

Fast read/write operation is critical to the performance of the hard disk. Hard disc drive being a mechanical device and actuator arms being cantilevered assemblies, which act as spring-mass-damper systems, are susceptible to vibrations at their natural frequencies. These vibrations could be excited by external forces, such as the one generated by the spindle motor or voice coil motor during positioning of the read/write head above a target track during a read/write operation. These resonant frequencies could affect the precise positioning of the head over the track, which would inevitably delay the read/write operation. As the capacity of the hard disc is increased to meet demands of increased storage requirements, the tack widths are being progressively reduced. Slightest vibration in the actuator arm could off-track the head uncomfortably close to an adjacent track during a read/write operation. This can result in track encroachment and data corruption. Every closed loop servo motor system has a predetermined bandwidth in which mechanical resonances occurring within the bandwidth degrade the performance of the servo motor system. The actuator arm is one key source of unwanted mechanical resonances. Accordingly, the bandwidths of most servo motor systems are designed so that resonance of the actuator arm occurs outside the bandwidth.

The actuator arm is driven by the voice coil motor. The voice coil motor includes moving voice coil magnet assembly to move the head over the rotating disc. The voice coil is supported by a fantail or overmould structure of the actuator arm and is hovering in a magnetic field. Generally the magnetic field produced by a single magnet is diverging with numerous stray flux compared to that of a double magnet configuration. This diverging magnetic field flux of a single magnet configuration accentuates the tipping of the actuator arm and excites the resonant frequencies of the actuator arm. During a bending resonant mode of an actuator arm carrying top and bottom head-gimbal-assemblies, the top and bottom suspension assemblies vibrate out of phase from each other. During such bending resonant mode of the top head-gimbal-assembly and the coil would be 180 degrees out-of-phase with the bottom head-gimbal-assembly and the coil. In such cases, the servo controller can only control one of the head-gimbal-assembly, while the other head-gimbal-assembly vibrates out-of-phase with the coil. This means that only one head-gimbal-assembly is controlled and stable while the other head-gimbal-assembly is vibrating. This problem gets worse when the actuator arm is reading or writing data at the innermost and outermost positions of a disc.

Actuator arms and suspensions can be made thicker to increase the bending and torsion mode frequencies, but the greater mass significantly degrades the performance of the actuator assembly by increasing the moment of inertia of the arm. Inertial increase will increase the access time for moving the transducer between data tracks. Yet another problem of increasing the arm and suspension thickness is, it can increase the current requirements necessary to move the voice coil motor. Increased current results in increased heat within the disk enclosure and increased power requirements.

What is needed is an actuator arm that produces a reduced out-of-phase motion between the top and bottom head-gimbal assemblies during an arm bending resonant mode of the actuator arm to provide a better stability to the servo motor system. Further what is needed is to reduce off-track motion of the transducer head/slider due to the out-of-phase motion in the actuator arm during seek and track follow operations of the disc drive.

SUMMARY OF THE INVENTION

Disc drives are made with an actuator designed with at least one asymmetrical arm having two masses that move out of phase. According to a preferred embodiment, the arm is modified by removing a portion of the higher-energy (longitudinal) side, the one with the greater total time-averaged strain energy. This modification reduces the phase difference between the first and the second arm in general, and particularly for a relevant frequency range of interest. Disc drives made by this method exhibit a generally reduced out-of-phase motion, enhancing performance during seeking and track following, especially for arms with two heads that interact with surfaces of opposing discs.

Additional features and benefits will be apparent upon a review of the following figures and their accompanying detailed description.

DESCRIPTION OF THE PREFERRED EMBODIMENT

In the following detailed description of the preferred embodiments, reference is made to the accompanying drawings, which form a part hereof, and in which are shown by way of illustration specific embodiments in which the invention may be practiced. It is to be understood that other embodiments may be utilized and structural changes may be made without departing from the scope of the present invention.

The invention described in this application is useful with all mechanical configurations of disc drives having either rotary or linear actuation. In addition, the invention is also useful in all types of disc drives including hard disc drives, zip drives, floppy disc drives and any other type of drives where unloading the transducer from a surface and parking the transducer may be desirable.

Figure 1:
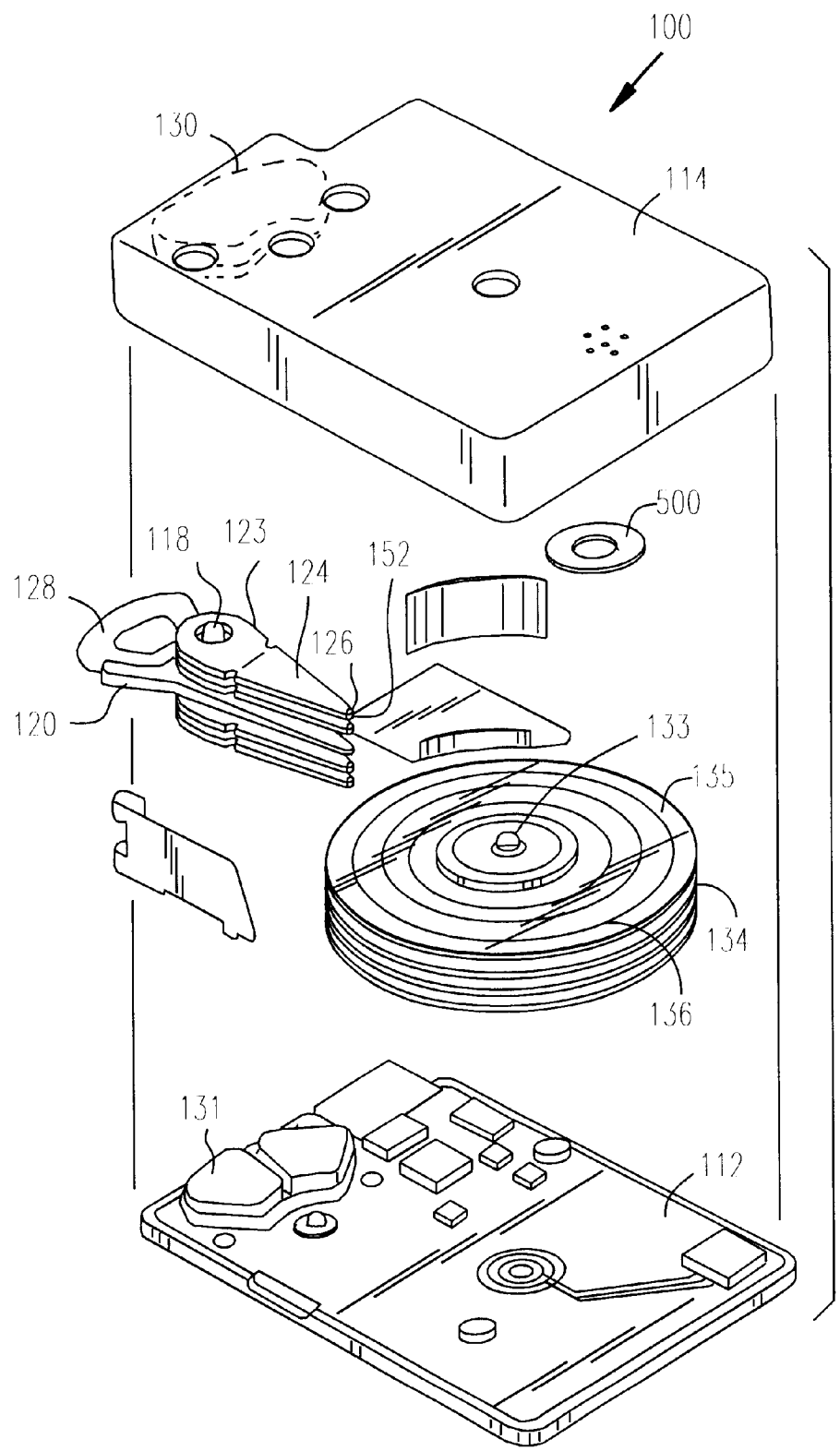
FIG. 1 is an exploded view of a disc drive with a multiple disc stack.

FIG. 1 is an exploded view of one type of a disc drive 100 having a rotary actuator. The disc drive 100 includes a housing or a base 112, and a cover 114. The base 112 and cover 114 form a disc enclosure. An inertia ring 500 is attached to the cover 114. Rotatably attached to the base 112 on an actuator shaft 118 is an actuator assembly 120. The actuator assembly 120 includes a comb-like structure having a plurality of actuator arms 123. Attached to the separate arms 123 on the comb, are load beams or load springs 124. Load beams or load springs are also referred to as suspensions. Attached at the end of each load spring 124 is a slider 126, which carries a magnetic transducer 152. The slider 126 with the transducer 152 form what is many times called the head. The head with the load spring 124 is often called the head gimbal assembly. It should be noted that many sliders have one transducer 152 and that is what is shown in the figures. It should also be noted that this invention is equally applicable to sliders having more than one transducer, such as what is referred to as an MR or magneto resistive head in which one transducer 152 is generally used for reading and another is generally used for writing. On the end of the actuator arm assembly 120 opposite the load springs 124 and the sliders 126 is a voice coil 128.

Attached within the base 112 is a first magnet 130 and a second magnet 131. As shown in FIG. 1, the first magnet 130 is associated with the cover 114. The first and second magnets 130, 131, and the voice coil 128 are the key components of a voice coil motor, which applies a force to the actuator assembly 120 to rotate it about the actuator shaft 118. Also mounted to the base 112 is a spindle motor. The spindle motor includes a rotating portion called the spindle hub 133. In this particular disc drive, the spindle motor is within the hub. In FIG. 1, a number of discs 134 are attached to the spindle hub 133. Each of the discs 134 has a recording surface 135. Only one disc 134 is numbered for the sake of clarity. In other disc drives a single disc or a different number of discs may be attached to the hub. The invention described herein is equally applicable to disc drives which have a plurality of discs as well as disc drives that have a single disc. The invention described herein is also equally applicable to disc drives with spindle motors which are within the hub 133 or under the hub.

Figure 2:
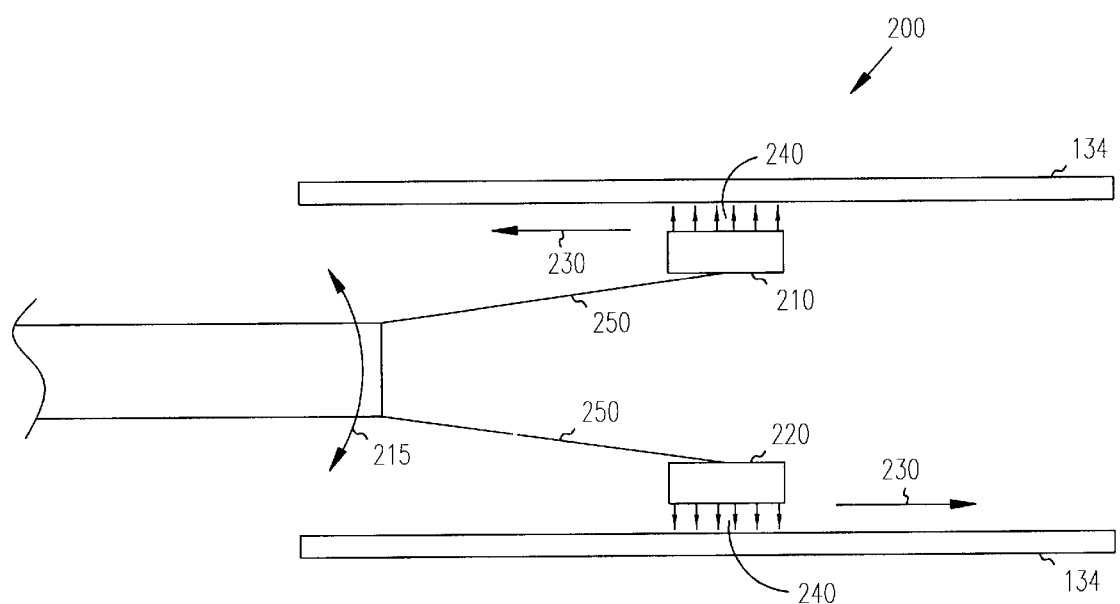
FIG. 2 is a schematic showing out-of-phase motion of top and bottom head-gimbal assemblies attached to an actuator arm shown in FIG. 1 during a first resonant mode.

Referring now to FIG. 2, there is shown a schematic 200 of an out-of-phase motion 230 generated between the top and bottom head gimbal assemblies 210 and 220 during a first resonant mode of a initially-designed actuator arm 123. As shown in FIG. 2, the top and bottom head suspension assemblies 210 and 220 are coupled to the actuator arm 123 of the disc drive 100 shown in FIG. 1. The head suspension assemblies 210 and 220 and the actuator arm 123 are in actuating relationship with respect to the rotating discs 134 of the disc drive 100. In some embodiments, the disc drive can include one or more actuator arms and each of the one or more actuator arms 123 can include one or more head suspension assemblies 210 and 220.

The initially-designed actuator arm's 123 first bending and torsion resonant mode shapes are generally determined by its distributed spring-mass structures. As shown in FIG. 2, the actuator arms 123 first bending and torsion resonance mode is restricted in the z direction by a bias force 240 applied to the head gimbal assemblies 210 and 220 by the load springs 250 and a lifting force from the air bearing. Whereas the first resonance mode along the actuator arm axis direction 230 is not restricted as shown in FIG. 2. Due to the nature of the spring-mass distribution of the initially-designed actuator arm 123, the first resonance mode creates an out-of-phase motion between the head gimbal assemblies 210 and 220 as shown in FIG. 2. By the same token, the relative phase relationships between the top head gimbal assembly 210 can be 180 degrees out-of-phase with respect to that of the bottom head gimbal assembly 220 and the voice coil motor. This out-of-phase motion generated during the first resonant mode of the actuator arm 123 poses a problem in servo control of the actuator arm motion during track follow and seek operations. During the actuator arms 123 bending resonant mode, only one of the two head gimbal assemblies 210 and 220 would be vibrating in phase with controlling coil of the servo controller, while the other head gimbal assembly would be vibrating out-of-phase with the coil. This means that only one head gimbal assembly, is stable and controllable (seen as increase in phase by the servo control system) while the other head is resonating out-of-phase with the coil and uncontrollable (seen as drop in phase by the servo system). This out-of-phase motion between the top and bottom head gimbal assemblies 210 and 220 can result in translation motions 230 between the top and bottom head gimbal assemblies 210 and 220. These translation motions 230 can get severe at extreme most positions of the disc 134, and can result in off-track motion in the actuator arm during the track follow and seek operations. If there is insufficient phase in the control loop, the servo controller may not be able to compensate for such off-track motions.

Figure 3:
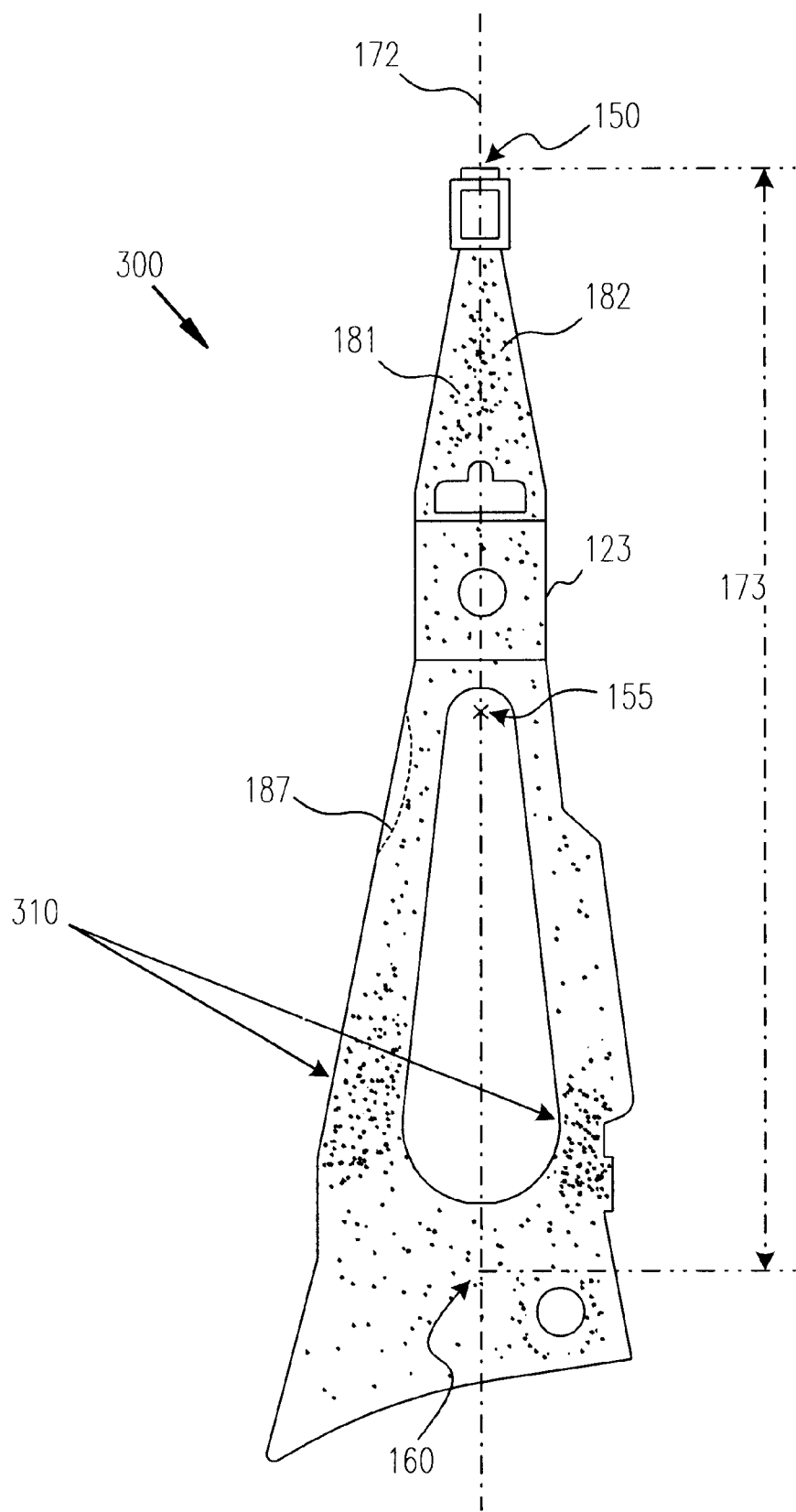
FIG. 3 is a finite element force response model showing out-of-phase differences between the top and bottom head-gimbal assemblies shown in FIG. 2.

Referring now to FIG. 3, there is shown a finite element force response model showing unsymmetrical strain energy surrounding node points 310 resulting in out-of-phase differences between the top and bottom head-gimbal assemblies shown in FIG. 2. Each node point 310 has a point of maximum time-averaged strain energy as well as a surrounding region of elevated strain energy. Such asymmetry can affect track follow and seek performance of the disc drive 100 shown in FIG. 1. Finite element modeling such as the one showed in FIG. 3 was used to verify the symmetry of strain energy in the initially-designed actuator arm 123 during a first resonance bending mode. The initially-designed actuator arm 123 shown in FIG. 3 revealed high unsymmetrical strain energy distribution surrounding the node points 310 (high unsymmetrical stress concentration regions) during the first bending and torsion resonant mode resulting in anti-symmetrical bending in the actuator arm 123. The frequency response function obtained from the parameterized finite element model revealed the unsymmetrical strain energy surrounding node points 310 resulting in out-of-phase differences between the top and bottom head-gimbal assemblies.

Figure 4:
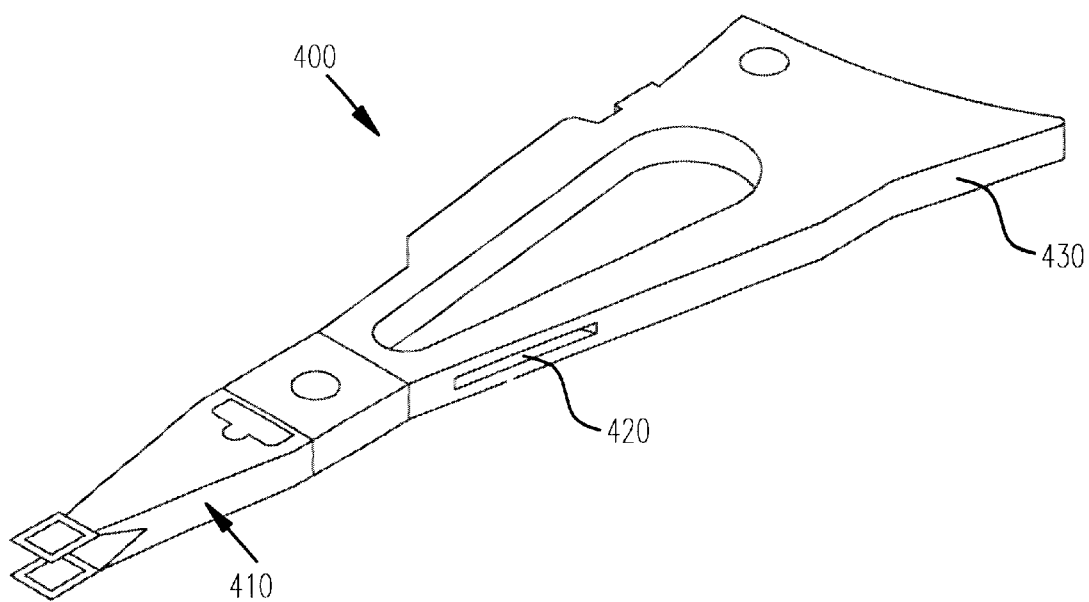
FIG. 4 is a schematic showing a side groove used in the actuator arm shown in FIG. 1 to reduce out-of-phase motion in top and bottom head-gimbal assemblies.

Arm 300 has a central axis 172 along its length 173. The length is defined by a rigidly fixed proximal endpoint 160, a distal endpoint 150 that is prone to lateral disturbances, and a midpoint 155 between the endpoints. The axis 172 divides the left side 181 from the right side 182. Roughly speaking, each dot represents a quantity of energy in a cell containing the dot so that the concentrations of dots indicates an energy concentration quantitatively and qualitatively. Close examination of FIG. 3 will reveal that the left side 181 has more dots than the right side 182, correctly indicating that the left side has more total strain energy than the right side 182. A portion of the left side 181 will accordingly be removed by cutting an elongated notch as shown by contour line 187. FIG. 4 shows the resulting notch 420 substantially to scale. Advantageously, the distal end 150 is nearer to the notch 420 than to the highest-energy node points 310 of each side.

Referring now to FIG. 4, there is shown an actuator arm 410 including a side groove 420 to reduce the out-of-phase motion in the top and bottom head-gimbal assemblies 210 and 220 shown in FIG. 2 of the disc drive 100. In some embodiments, the side groove 420 is located substantially near the unsymmetrical stress concentration regions 310 shown in FIG. 3. In these embodiments, the side groove 420 is located on a side 430 of the actuator arm 410. Further in these embodiments, the side groove 420 is located substantially in the middle of side 430 of the actuator arm 410. The side groove 420 can be formed by machining the side 430 of the actuator arm 410 to remove a portion of the actuator arm 410 material as shown in FIG. 4. In some embodiments, the side groove 420 is semi circular in shape. The size and shape of the side groove 420 can be any shape that aids in producing a feasible actuator arm 410 in a high volume manufacturing operation and at the same time reduces out-of-phase motion between the top and bottom head gimbal assemblies 210 and 220.

Figure 5:
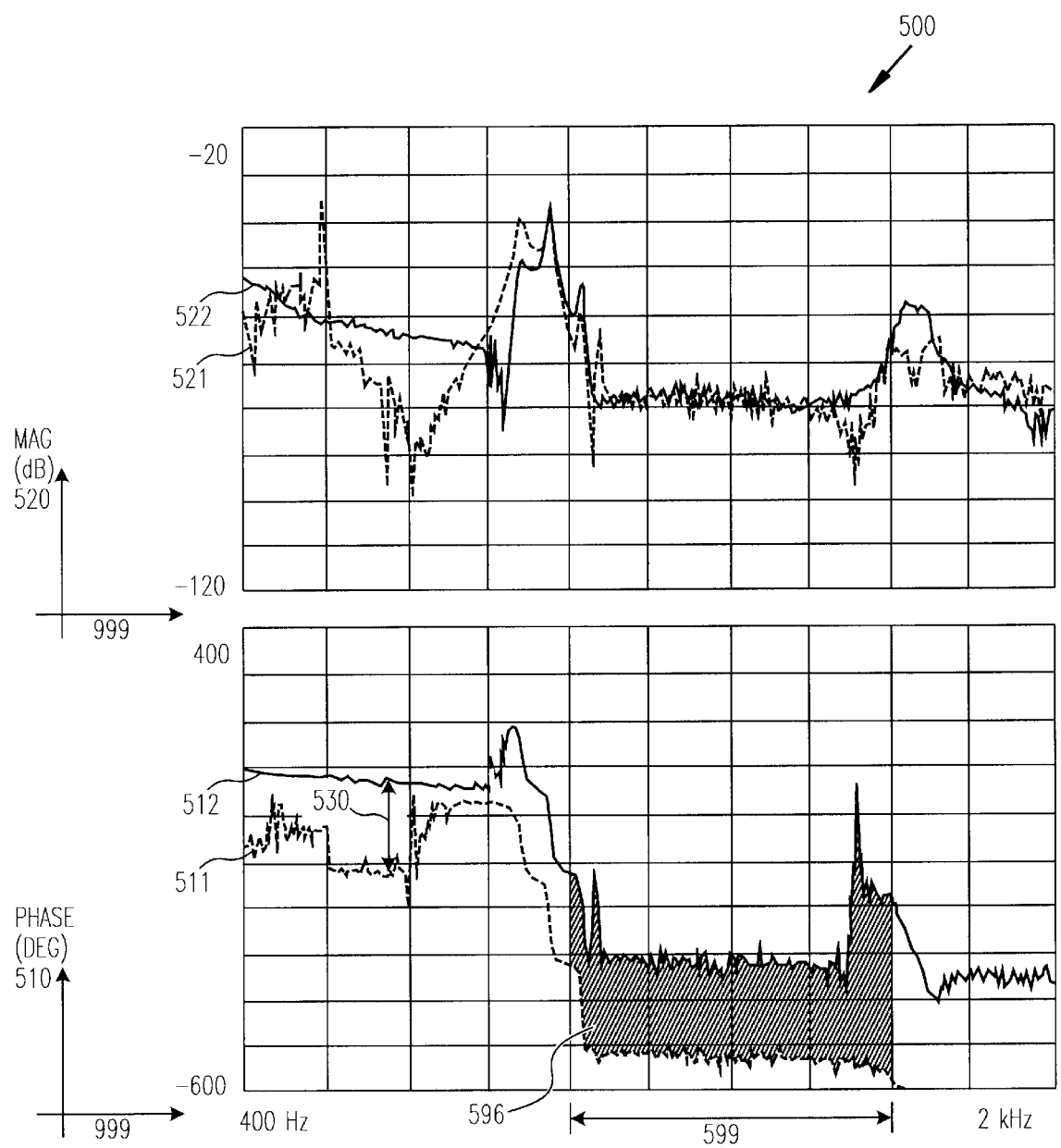
FIG. 5 is a graph showing mechanical frequency response function of top and bottom head gimbal assemblies attached to an actuator arm without a side groove.

FIG. 5 shows functions relating to the initial actuator 300 (prior to the modification of the present invention) plotted against frequency 999. These include 521 (magnitude 520 in decibels) and 511 (phase 510 in degrees) of a first head and similar frequency response functions 522 and 512 of a second head. Note that these heads exhibit a large phase difference 530, particularly noted by the area 596 between the phase functions 511, 512 within the relevant frequency range 599.

Figure 6:
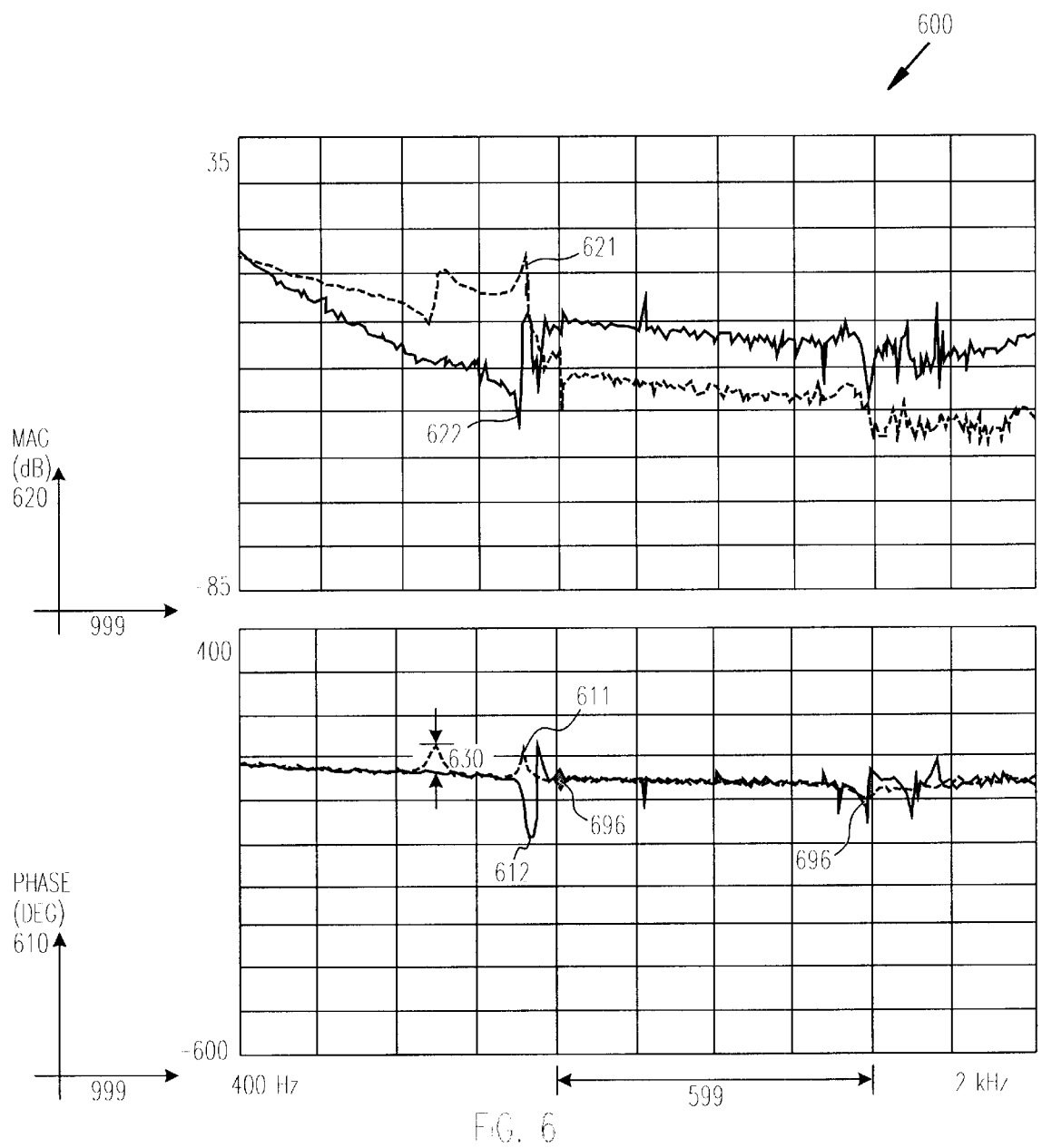
FIG. 6 is a graph showing mechanical frequency response function of top and bottom head gimbal assemblies attached to an actuator arm with a side groove.

FIG. 6 shows frequency response functions of actuator arm 300 after modifications according to the present invention. Functions 611 and 621 correspond with first head of FIG. 5, and functions 612 and 622 correspond with the second head of FIG. 5. Note that the area between the phase functions 611, 612 is markedly less within the relevant frequency range, although the phase difference 630 may be slightly enlarged at some frequencies.

FIGS. 5 & 6, which reflects actual measurements, illustrates that the out-of-phase relationship between top and bottom head gimbal assemblies like 210 and 220 (anti resonance effect of top head gimbal assembly 210) was considerably reduced with the inclusion of removed material. In particular, the side groove 420 in the actuator arm 410 caused the reduction of average phase difference 596.

Figure 7:
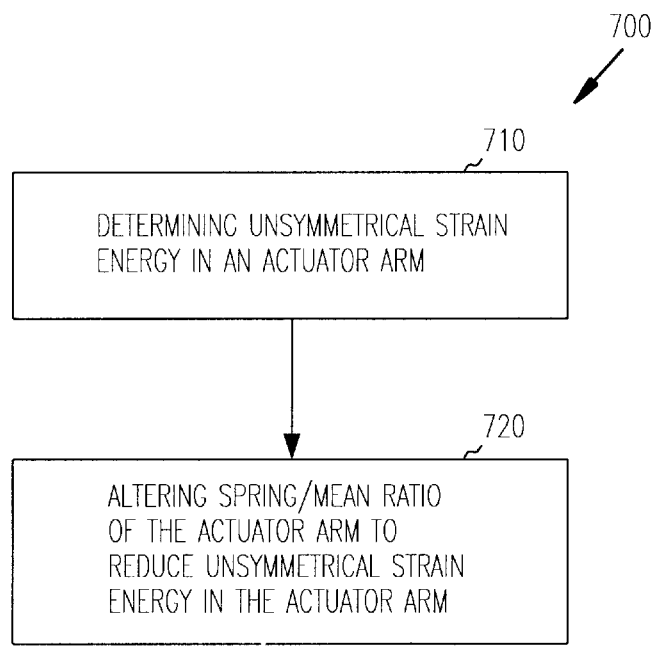
FIG. 7 is a flow diagram of a method to reduce out-of-phase motion in the top and bottom head-gimbal assemblies during a bending resonant mode of an actuator arm shown in FIG. 2.

FIG. 7 is a flow diagram illustrating a method to reduce out-of-phase motion in the top and bottom head-gimbal assemblies during a bending resonant mode of an actuator arm shown in FIG. 2. In this example embodiment shown in FIG. 7, the method 700 begins with step 710 of determining unsymmetrical strain energy distribution generated in an actuator arm during a first resonant bending mode which causes an out-of-phase motion in top and bottom head gimbal assemblies attached to the actuator arm. The first resonant mode can be first bending and torsion resonant mode of the actuator arm. In some embodiments, the unsymmetrical strain energy generated during the first resonant mode is determined using a parameterized fine element response model.

Step 720 includes altering a spring mass structure of the actuator arm to reduce the unsymmetrical strain energy so that the out-of-phase motion between the top and bottom head gimbal assemblies are reduced during the arm bending first resonant mode of the actuator arm. Also, the spring mass structure of the actuator arm is altered to reduce the off-track motion of the head gimbal assemblies caused by the first resonant mode in the actuator arm during track follow and seek operations of a disc drive. In some embodiments, the altering of the spring-mass structure of the actuator arm includes removing a portion of the actuator arm material to reduce out-of-phase motion between the top and bottom head gimbal assemblies. Removing of the actuator arm material can include removing the material around a high stress concentration region of the actuator arm. In some embodiments, the groove is formed on a side of the actuator arm and around the high stress concentration region such that the out-of-phase motion between the top and bottom head gimbal assemblies are reduced to improve performance of the disc drive during track follow and seek operations. In some embodiments, the groove is machined on a side of the actuator arm and around the high stress concentration region such that the out-of-phase motion between the top and bottom head gimbal assemblies are reduced to improve performance of the disc drive during track follow and seek operations. In some embodiments, the shape of the groove formed on the side of the actuator arm can be semi-circular in shape.

Figure 8:
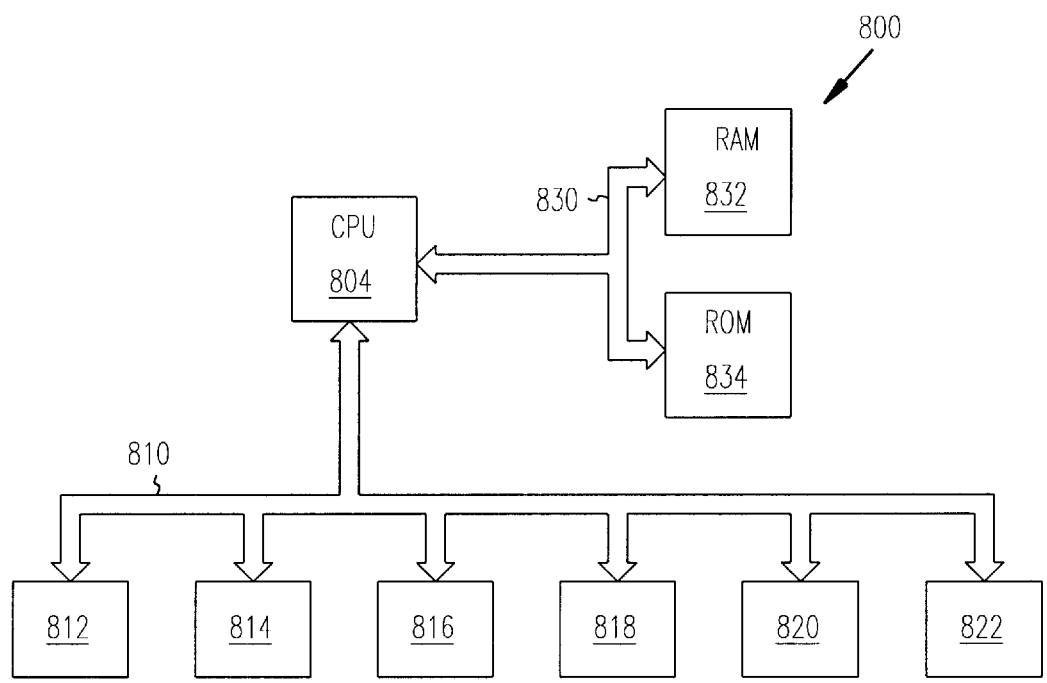
FIG. 8 is a schematic view of a computer system.

FIG. 8 is a schematic view of a computer system. Advantageously, the invention is well suited for use in a computer system 800. The computer system 800 may also be called an electronic system or an information handling system and includes a central processing unit, a memory and a system bus. The information handling system includes a central processing unit 804, a random access memory 832, a read-only memory 834 and a system bus 830 for communicatively coupling the central processing unit 804 with the random access memory 832 and the read-only memory 834.

The information handling system 800 may also include an input/output bus 810 and several peripheral devices, such as 812, 814, 816, 818, 820, and 822 may be attached to the input output bus 810. Peripheral devices may include hard disc drives, magneto-optical drives, floppy disc drives, monitors, keyboards and other such peripherals. Any type of disc drive may include an improved actuator arm as described above.

Figure 9:
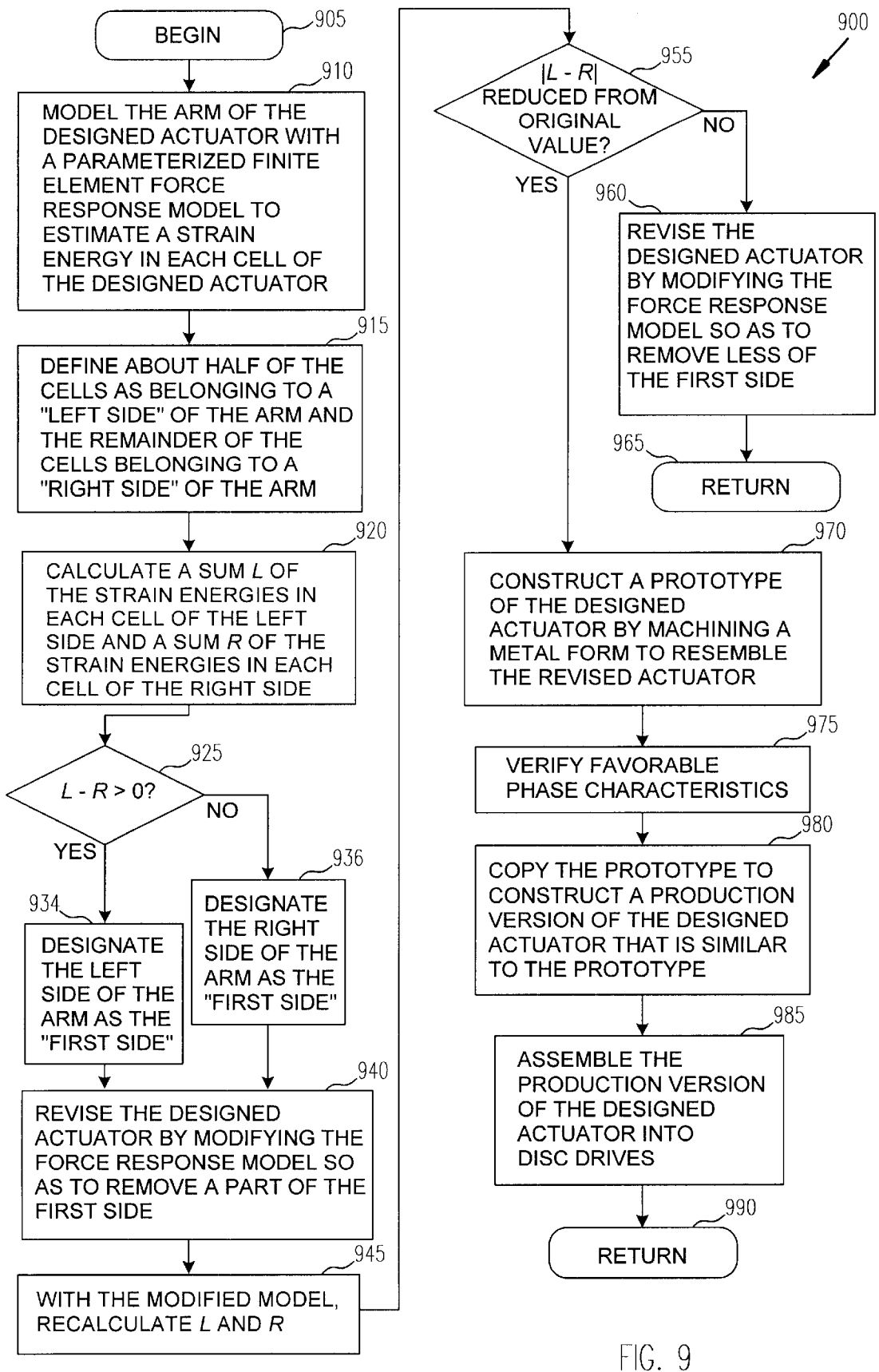
FIG. 9 is a flow diagram illustrating a preferred method of the present invention.

FIG. 9 illustrates a preferred method 900 of the present invention comprising steps 905 through 990. The arm is modeled 910 with a parameterized finite element force response model to estimate a strain energy in each of many portions (cells) of the designed actuator. The cells are then allocated 915 into a "left side" and a "right side" of the arm. Next, the sum of the strain energies in the cells are allocated to their respective sides, calculating sums L and R 920 as respective estimates of total strain energy for the left and right sides. The "first side" will be the left side 934 if L–R is greater than zero 925, and otherwise the "first side" will be the right side 936. Next, the designed actuator is revised 940 by modifying the force response model so as to remove a portion of the first side having many cells. If L and R have new values 945 such that L–R has a magnitude that is not reduced 955, the actuator design is revised again 960. For example, this may involve returning 965 to repeat step 940 with a lesser portion removed, and then repeating steps 945 and 955. With a sufficiently small reduction in step 940, it will almost always be possible to improve performance using this preferred method.

Once a reduced |L–R| has been obtained, a prototype is constructed 970 by machining a metal form to resemble the revised actuator 970. In general, this will be seen to improve phase characteristics, which improvement is verified in step 975. Then, the prototype is copied to construct a production version of the actuator that is similar to the prototype in step 980. Finally, the production version is assembled into disc drives 985.

Not all embodiments of the present invention require the use of a force response model. For example, steps 910 through 970 of the method of FIG. 9 can be replaced by a cruder method of modifying the first side by moving or removing material from a prototype of an initial arm design in response to a determination that first and second masses of an arm exhibit a problematic nonzero phase difference. As indicated above, removal of a sufficiently small amount of material from the first side will almost always improved the spring-mass structure of an actuator arm.

Alternatively characterized, a first embodiment of the present invention is a method of making a disc drive. An actuator arm 300 is initially designed with a spring-mass structure characterized by an oscillation mode 215 having an initial (varying or non-zero) phase difference 530 between a first and a second mass 210,220 of the arm 300. For some "relevant frequency range" 599 of about 50 to 500 Hz or more, the present method generally reduces the magnitude of the phase difference from an initial value 530 (a function of frequency) to a modified value 630 (also a function of frequency). More particularly, the frequency-averaged magnitudes of these values 530,630 across the relevant frequency range 599 will be such that the modified arm has a lower frequency-averaged magnitude. Graphically, this is apparent because the area 596 between the phase curves 511,512 of FIG. 5 is much greater than the area 696 between the phase curves 611,612 of FIG. 6. (It should be understood that the frequency-averaged magnitude of FIG. 5 can be obtained as the area 596 divided by the frequency range 599.) In the depicted example, the frequency-averaged magnitude of the modified phase difference 630 is about 45 to 450 degrees smaller than the frequency-averaged magnitude of the initial phase difference 530 within the relevant range 599.

A second embodiment is a disc drive 100 including a housing 112 and two or more discs 134 rotatable about a central axis within the housing. The two or more discs 134 further include recording surfaces 135 having tracks 136 on both sides of the discs. The disc drive also includes a voice coil motor and an actuator arm 123. The voice coil motor is mounted within the housingc112. One end of the actuator arm 123 is coupled to the voice coil motor, and other end of the actuator arm is coupled to top and bottom head gimbal assemblies 210 and 220 to read/write information stored on the tracks 136 of the two or more rotatable discs 134. The actuator arm 123 has a side groove 420 to reduce out-of-phase motion generated between the top and bottom head gimbal assemblies 210 and 220 during a first resonant mode of the actuator arm 123. The side groove 420 is located on a side 430 of the actuator arm 123 such that it reduces unsymmetrical strain energy (developed during a bending and torsion resonant mode) in the actuator arm 123 by distributing the spring-mass structure in the actuator arm 123 so that the out-of-phase motion in the top and bottom head gimbal assemblies 210 and 220 are reduced.

A third embodiment is a method 700 to reduce an out-of-phase motion in the top and bottom head gimbal assemblies during a first resonant mode of an actuator arm to reduce off-track motion in an actuator arm during track follow and seek operations of a disc drive. The method beings with the step 710 of determining an unsymmetrical strain energy distribution generated in the actuator arm during a first resonant mode, which causes the out-of-phase motion between the top and bottom head gimbal assemblies. The out-of-phase motion between the top and bottom head gimbal assemblies. Then, the method includes the step 720 of altering the spring-mass structure of the actuator arm to change unsymmetrical strain energy in the actuator arm to reduce the out-of-phase motion in the top and bottom head gimbal assemblies to reduce the off-track motion in the actuator arm during the track follow and seek operations of the disc drive.

It is to be understood that the above description is intended to be illustrative, and not restrictive. Many other embodiments will be apparent to those of skill in the art upon reviewing the above description. For example, actuator arms with other masses than a second head gimbal assembly may also suffer from out-of-phase motion that may be reduced according to the present invention. The scope of the invention should, therefore, be determined with reference to the appended claims, along with the full scope of equivalents to which such claims are entitled.

What is claimed is:

1. A method of making a disc drive having an actuator designed with an asymmetrical arm having a length, the arm having first and second longitudinal sides, the method comprising steps of:
    (a) determining that the actuator is designed with a spring-mass structure characterized by an oscillation mode having an initial phase difference between a first and a second mass of the arm of the designed actuator;
    (b) modifying the arm of the designed actuator by removing a portion of the first side, the first side having a total time-averaged strain energy greater than a total time-averaged strain energy of the second side, so that the modified arm has a modified phase difference between the first and the second mass, the modified phase difference having a frequency-averaged magnitude smaller than a frequency-averaged magnitude of the initial phase difference across a relevant frequency range of at least 50 Hertz; and
    (c) assembling the designed actuator into the disc drive so that the first mass is positioned adjacent a first rotatable disc.

2. The method of claim 1 in which the determining step (a) and the modifying step (b) are performed upon a prototype of the designed actuator, the arm of which is modified during step (b), in which the assembling step (c) includes steps of:
    (c1) copying the modified prototype to construct a production version of the designed actuator that is similar to the modified prototype; and
    (c2) assembling the production version of the designed actuator into the disc drive.

3. The method of claim 1 in which the modifying step (b) includes steps of:
    (b1) initially modeling the arm of the designed actuator with a parameterized finite element force response model to estimate a strain energy in each of many portions of the designed actuator, about half of the portions belonging to a left side of the arm, the remainder of the portions belonging to a right side of he arm;
    (b2) calculating a sum of the strain energies in each portion of the left side;
    (b3) calculating a sum of the strain energies in each portion of the right side;
    (b4) designating the left side of the arm as the first side if the left side's sum>the right side's sum, and otherwise designating the right side as the first side;
    (b5) revising the designed actuator by modifying the force response model so as to remove many of the portions of the first side; and
    (b6) constructing the designed actuator by machining a metal form to resemble the designed actuator revised in step (b5).

4. The method of claim 1 in which the determining step (a) comprises a step (a1) of constructing the actuator and in which the modifying step (b) comprises a step of removing the portion of the first side by a machining operation.

5. The disc drive made according to the method of claim 1 in which the asymmetrical arm has a concave recess on its first side resulting from the portion removed during the modifying step (b).

6. The disc drive according to claim 5 in which the concave recess is closer to a midpoint of the length than to a nearest endpoint of the length.

7. The method of claim 1 in which the oscillation mode of the modifying step (b) is a first bending mode of the actuator arm containing energy that translates to a respective disturbance in each of the first and second masses that is parallel to a surface of the first rotatable disc, the disturbances tending to enlarge the frequency-averaged magnitude of the initial phase difference.

8. The method of claim 1 in which the modifying step (b) is performed so that the modified magnitude is smaller than the initial magnitude by at least 45 degrees and so that the relevant frequency range has a width of at least 500 Hertz.

9. The disc drive made according to the method of claim 1 in which the first mass includes a first head that is positioned adjacent the first rotatable disc during a first data transfer and in which the second mass includes a second head that is positioned adjacent a second rotatable disc during a second data transfer.

10. A method of reducing an out-of-phase motion in top and bottom head-gimbal assemblies generated during a bending and torsion resonant mode of an actuator arm to reduce off-track motion of the actuator arm during track follow and seek operations of a disc drive, both head-gimbal assemblies being attached to the actuator arm, the method comprising steps of:

(a) determining unsymmetrical strain energy distribution generated in the actuator arm during the bending and torsion resonant mode which causes the out-of-phase motion in the top and bottom head-gimbal assemblies; and (b) altering the spring-mass structure of the actuator arm to reduce the unsymmetrical strain energy such that the out-of-phase motion between the top and bottom head-gimbal assemblies are reduced, and to further reduce the off-track motion in the head gimbal assembly during the track follow and seek operations.

11. A method of making a disc drive comprising steps of:

(a) a step for removing a portion of an actuator arm to enhance a servo characteristic of the actuator arm by reducing an out-of-phase motion in a first and second mass of the actuator arm; and (b) assembling the actuator arm into a disc drive.

* * * * *